United States Patent [19]
Ishikawa

[11] Patent Number: 5,176,861
[45] Date of Patent: Jan. 5, 1993

[54] METHOD OF PRODUCING SHEET MADE OF A LOW-VISCOSITY POLYESTER RESIN

[75] Inventor: Shinji Ishikawa, Osaka, Japan

[73] Assignee: Osaka Chemical Co., Ltd., Osaka, Japan

[21] Appl. No.: 711,088

[22] Filed: Jun. 6, 1991

[30] Foreign Application Priority Data

Feb. 22, 1991 [JP] Japan .................. 3-50521

[51] Int. Cl.⁵ .......................................... B29C 51/10
[52] U.S. Cl. ......................... 264/101; 264/37; 264/210.2; 264/211.23; 264/553; 264/571; 264/288.4; 264/322; 264/DIG. 69; 425/203
[58] Field of Search ............. 264/101, 235.8, 290.2, 264/288.4, 210.2, 210.7, 37, 322, DIG. 69, 211.23, 571, 553, 554; 425/203, 204, 202

[56] References Cited

U.S. PATENT DOCUMENTS

| | | | |
|---|---|---|---|
| 3,795,468 | 3/1974 | Hester et al. | 425/202 |
| 4,162,880 | 7/1979 | Cobbs et al. | 425/202 |
| 4,238,443 | 12/1980 | Levy | 264/210.7 |
| 4,272,475 | 6/1981 | Chi | 264/210.1 |
| 4,617,164 | 10/1986 | Kanesaki et al. | 264/235.8 |
| 4,863,652 | 9/1989 | Chang | 425/203 |

FOREIGN PATENT DOCUMENTS

| | | | |
|---|---|---|---|
| 58-145421 | 8/1983 | Japan | 264/210.7 |
| 62-134242 | 6/1987 | Japan | 264/322 |
| 62-284710 | 12/1987 | Japan | 264/37 |
| 63-202408 | 8/1988 | Japan | 425/203 |
| 63-230317 | 9/1988 | Japan | 425/203 |
| 1427837 | 3/1976 | United Kingdom | 264/322 |

Primary Examiner—Jeffery Thurlow
Attorney, Agent, or Firm—Birch, Stewart, Kolasch & Birch

[57] ABSTRACT

Polyester sheets are produced by melting a low-viscosity polyester such as a recovered polyester under reduced pressure, extruding the melt into a sheet, and stretching the sheet in the direction of width by 2.5 to 120%. The polyester resin of the oriented sheet thus obtained has an intrinsic viscosity of 0.40 to 0.63. Polyester sheets can be produced readily and continuously from recovered polyester resins or polyester resins below standards, which have a low intrinsic viscosity, and the cost of production of polyester sheets is reduced. These sheets can be formed into various shaped articles by vacuum forming, pressure forming or the like without occurrence of draw-down and without giving defective shaped articles.

10 Claims, 1 Drawing Sheet

METHOD OF PRODUCING SHEET MADE OF A LOW-VISCOSITY POLYESTER RESIN

FIELD OF THE INVENTION

This invention relates to a sheet made of a polyester resin with a low intrinsic viscosity, such as a recovered polyester resin or a polyester resin below standards, to a method of producing the same, and to a polyester container formed from such sheet.

BACKGROUND OF THE INVENTION

As a result of recent expansion in the use of polyester resin made bottles as well as various trays and other containers derived from polyester sheets, such polyester products are now destined to be domestic wastes, which are discharged in large quantities. From the efficient resource utilization and environmental protection viewpoints, it is very important to recover useful polyester resins from such large quantities of domestic wastes and reuse them, namely to recycle useful polyester resins. To recover and reuse products below standards as obtained in polyester sheet molding is also important from the cost reduction viewpoint.

For producing sheets (the term "sheet" as used herein means that it has a thickness of not less than 125 $\mu$m) from a fresh polyester resin material, said polyester resin should generally have an intrinsic viscosity ($\eta$) of not less than 0.70 and a moisture content of not higher than 50 ppm so that sufficient moldability can be assured. Essentially, thermoplastic resins are regenerable even after molding or forming thereof. In actuality, however, heating and other effects which occur in the process of molding and heating cause marked decreases in moldability resulting from decreases in physical characteristics, for example in intrinsic viscosity. Thus, for example, polyester resins recovered after molding or forming generally have a reduced intrinsic viscosity of 0.45 to 0.70 and a moisture content of about 2,000 to 3,000 ppm.

When sheets produced using such recovered polyester resins are subjected to vacuum forming, the so-called draw-down (sagging of sheets) takes place during said forming, making it impossible to give containers or giving unsatisfactorily shaped containers. Raw material polyesters having a moisture content exceeding 50 ppm cannot be processed into sheets because the viscosity decreases as a result of hydrolysis during molding.

Therefore, in the prior art, it is necessary, for forming polyester sheets into containers, to select a polyester resin having an intrinsic viscosity of not less than 0.70 and, furthermore, to reduce the moisture content to a level not higher than 50 ppm. For such a moisture content reduction, batchwise heating and drying at 140° to 160° C. for about 4 to 6 hours is required, which results in increases in production cost.

It is an object of the present invention to provide polyester sheets suited for forming into various containers by using low-viscosity polyesters, such as recovered polyesters or polyesters below standards. Another object of the invention is to provide a method of producing such polyester sheets. A further object of the invention is to provide containers formed from such polyester sheets.

SUMMARY OF THE INVENTION

The present invention provides a uniaxially oriented polyester resin sheet made of a polyester resin having an intrinsic viscosity of 0.40 to 0.63 with a draw ratio of 2.5 to 120% and a container formed from said sheet. The invention also provides a method of producing low-viscosity polyester sheets which comprises melting a polyester resin with an intrinsic viscosity of 0.45 to 0.70 at reduced pressure, extruding the melt into a sheet and stretching the sheet in a direction perpendicular to the direction of progression of said sheet.

According to the method of the invention, the raw material recovered polyester is dried in a molten state using a melt-extruder equipped with an evacuator so that the decrease in the viscosity of the recovered polyester material can be minimized. After sheet molding, the sheet is stretched in the direction of width at a draw ratio of 2.5 to 120%, preferably 20 to 50%, and then wound.

DETAILED DESCRIPTION OF THE INVENTION

Figure 1:
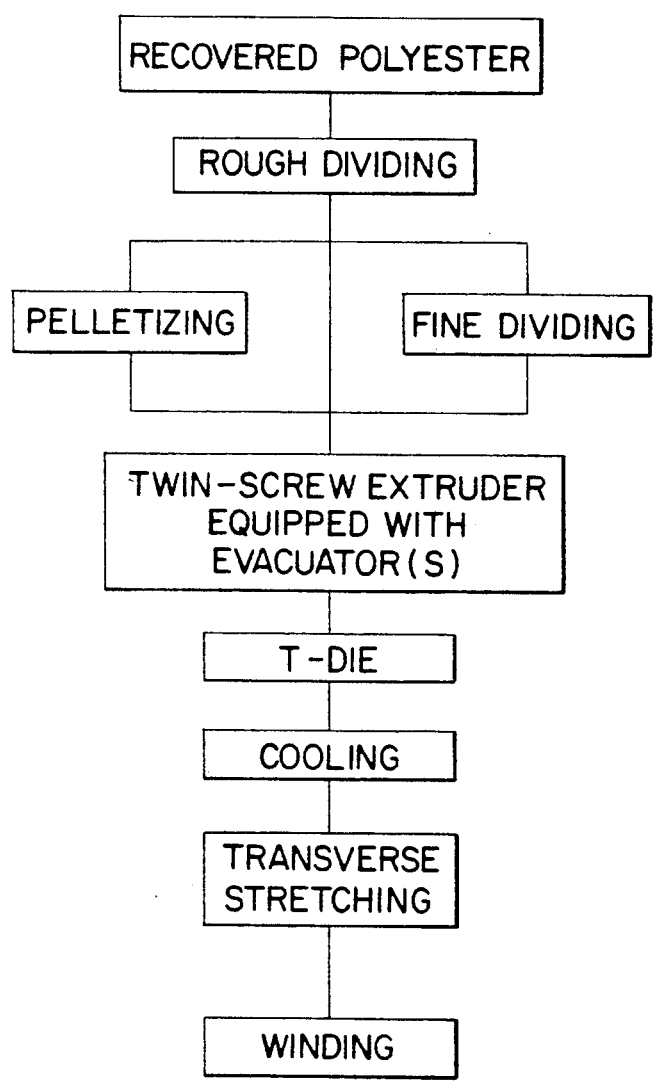
FIG. 1 shows a flowchart illustrating the present invention.

The raw material polyester resin to be used in the practice of the invention may be a recovered polyester resin recovered from such shaped articles as PET bottles or trays for foodstuffs, a polyester resin below standards, or a virgin material. It may also be a material below standards as resulting from molding or forming of polyester sheets or containers. As the polyester resin to serve as the raw material, there may be mentioned various polyester resins, for example polyethylene terephthalate, polybutylene terephthalate and polyethylene naphthalate. The intrinsic viscosity of such recovered polyester, which is the raw material for the sheet of this invention, is 0.45 to 0.70. The intrinsic viscosity is the value obtained by the Zimmer method in a mixed solvent composed of phenol and tetrachloroethane (60:40) at 20±0.5° C. using an Ubbelohde viscometer.

According to the production method of this invention, the recovered polyester resin or the like, which is the starting material, is fed, in an undried state, into an extruder. The extruder is equipped with at least one evacuator for reducing the pressure within the cylinder, preferably to 30 mmHg (absolute). The screws of the extruder may rotate in the same direction or different directions. Within the extruder, the raw material polyester is melted at 250° to 310° C. and, at the same time, dried to a moisture content of not more than 50 ppm. The raw material polyester is then extruded into a sheet from the die. Any known die for sheet molding, for example a T-die, may be used as the die. The melt sheet extruded from the die is cooled by a roll or rolls to give a sheet having a thickness of 125 to 1,000 $\mu$m. For the cooling, the polishing roll method, touch roll method, pinning method or a similar method may be used. The sheet is then heated to 60° to 180° C. and subjected to stretching. The stretching is performed in a direction perpendicular to the direction of sheet progression at a draw ratio of 2.5 to 120%, preferably 20 to 50%, using a tenter-type stretching machine for uniaxial orientation. If the draw ratio is smaller than 2.5%, the draw-down during forming into containers cannot be prevented. If, conversely, said ratio exceeds 120%, forming becomes difficult. The sheet after stretching may be subjected to any per se known post-treatment. The polyester that constitutes the thus-obtained uniaxially oriented polyester sheet shows an intrinsic viscosity of 0.40 to 0.63.

The polyester sheet obtained is reused by forming into trays for various foodstuffs, trays for industrial use or other containers using a per se known technique, for example the vacuum forming or pressure forming technique, in a similar manner to that used with sheets prepared from high-intrinsicviscosity polyester resins, without the phenomenon of draw-down.

The production method of this invention can readily give polyester sheets continuously using mostly recovered polyester resins and polyester resins below standards, which have a low intrinsic viscosity, as starting materials. The method requires no changes in downstream processing conditions due to the raw materials, enables continuous operation, and reduces the cost of production. The sheets of the invention that are made of a low-viscosity polyester are free from draw-down in the step of vacuum forming, pressure forming or the like and are suited for the manufacture of various shaped articles.

The following examples are further illustrative of the present invention.

EXAMPLE 1

A recovered polyester resin was processed in accordance with the flowchart shown in the accompanying FIG. 1 to give a polyester sheet. In this example, the starting recovered polyester was prepared by roughly dividing polyester sheets (200 mm in thickness) and then finely dividing approximately to a size of 4 to 8 mm square (intrinsic viscosity 0.56; moisture content 2,100 ppm). This material was fed into a twin-screw extruder equipped with an evacuator. The evacuation was carried out at 280° to 300° C. for attaining and maintaining 15 mmHg. A sheet was extruded from a T-die at a temperature of 285° C. at a flow (discharge) rate of 200 kg/hr and then cooled to give a polyester sheet with a thickness of 300 μm. The sheet was then heated to 160° C. and stretched in the direction of width at a draw ratio of 15% using a stretching machine, whereby a sheet with a width of 640 mm was obtained.

The recovered polyester sheet obtained was formed into trays (150×80×40 mm) using a vacuum former (Terada Kikai). The processing conditions were as follows: processing temperature 150° C., feed width 100 cm, forming cycle 7 seconds. No draw-down occurred and no inferior trays were obtained. The products obtained were all satisfactory in quality.

Some typical physical characteristics of the polyester sheet obtained and the results of forming using this sheet are shown in Table 1. The physical characteristics and behavior were measured or evaluated by the following methods:

Tensile strength: ASTM D822-52T,
Modulus of elasticity: ASTM D822-52T,
Draw-down: The sheet sagging, where occurred, was evaluated by the eye on the former (width 64 cm, length 100 cm). When the sheet sagging was not less than 100 mm, the judgment "draw-down occurred" was given.

EXAMPLES 2 TO 9 AND COMPARATIVE EXAMPLES 1 TO 6

Polyester sheets and containers were produced in the same manner as in Example 1 except that the respective starting polyesters and processing conditions set forth in Table 1 were used. The results thus obtained are shown in Table 1.

TABLE 1

Physical Characteristics and Behavior of Polyester Sheets

| Test No. | Starting polyester | | | | Product sheet | | | | Draw-down during forming |
|---|---|---|---|---|---|---|---|---|---|
| | Intrinsic viscosity | Moisture content ppm | Flow rate kg/h | Draw ratio % | Intrinsic viscosity | Decrease in intrinsic viscosity | Tensile strength kg/m2 | Modulus of elasticity | |
| Example 1 | 0.56 | 2,100 | 50 | 10 | 0.55 | 0.01 | 5.4 | 200 | No |
| Example 2 | 0.62 | 2,100 | 50 | 10 | 0.60 | 0.02 | 5.2 | 190 | No |
| Example 3 | 0.62 | 2,100 | 120 | 15 | 0.61 | 0.01 | 5.2 | 190 | No |
| Example 4 | 0.62 | 2,100 | 200 | 45 | 0.60 | 0.02 | 5.3 | 200 | No |
| Example 5 | 0.64 | 690 | 50 | 3 | 0.62 | 0.02 | 5.2 | 190 | No |
| Example 6 | 0.64 | 690 | 120 | 15 | 0.62 | 0.02 | 5.2 | 190 | No |
| Example 7 | 0.64 | 690 | 200 | 20 | 0.62 | 0.02 | 5.4 | 200 | No |
| Example 8 | 0.50 | 750 | 160 | 10 | 0.47 | 0.03 | 5.0 | 180 | No |
| Example 9 | 0.454 | 750 | 100 | 20 | 0.45 | 0.004 | 5.0 | 180 | No |
| Comparative Example 1 | 0.56 | 2,100 | 50 | 0 | 0.50 | 0.06 | 5.4 | 200 | Occurred |
| Example 2 | 0.714 | 4,070 | 160 | 0 | 0.537 | 0.177 | 7.6 | 225 | Occurred |
| Example 3 | 0.712 | 2,650 | 165 | 0 | 0.556 | 0.156 | 8.1 | 227 | Occurred |
| Example 4 | 0.607 | 3,100 | 160 | 0 | 0.574 | 0.033 | 10.9 | 206 | Occurred |
| Example 5 | 0.640 | 3,000 | 160 | 0 | 0.610 | 0.30 | 5.6 | 210 | Occurred |
| Example 6 | 0.640 | 3,000 | 160 | 1 | 0.610 | 0.30 | 5.6 | 210 | Occurred |

EXAMPLES 10 TO 17 AND COMPARATIVE EXAMPLE 7

Polyester sheets were prepared in Example 1 but changing the drawing rates and drawing temperatures as shown in Table 2. The polyester sheets (sample length: 200 mm) were fixed by clamps at both ends beneath the steel scale, and the amounts of draw-down were measured at 140° C. The results are shown in the following Table 2.

TABLE 2

Effect of Drawing Rate and Temperature

| | Drawing | | Draw-down (mm) |
|---|---|---|---|
| | Rate (%) | Temperature (°C.) | |
| Comparative Example 7 | 0 | — | 6 |
| Example 10 | 10 | 70 | 0 |
| Example 11 | 20 | 70 | 3 |
| Example 12 | 30 | 70 | 0 |
| Example 13 | 30 | 90 | 3 |
| Example 14 | 50 | 70 | 0 |
| Example 15 | 50 | 80 | 0 |
| Example 16 | 100 | 70 | 0 |
| Example 17 | 100 | 80 | 0 |

What is claimed is:

1. A method of producing low-viscosity polyester resin sheets which comprises melting a polyester resin with an intrinsic viscosity of 0.45 to 0.70 under reduced pressure extruding the melt into a sheet and stretching said sheet in a direction perpendicular to the direction of progression of said sheet.

2. The method as claimed in claim 1, wherein said stretching is performed in a direction perpendicular to the direction of progression of the sheet at a draw ratio of 2.5 to 120% at a temperature of 60 to 180° C.

3. The method as claimed in claim 1, wherein said melting is performed under reduced pressure at a temperature of 250° to 310° C.

4. The method as claimed in claim 1, wherein said melting is performed at a pressure of not higher than 30 mmHg.

5. The method as claimed in claim 2, wherein said draw ratio is 20-50%.

6. The method as claimed in claim 1, further comprising winding said stretched sheet.

7. The method as claimed in claim 1, wherein said polyester resin is selected from the group consisting of polyethylene terephthalate, polybutylene terephthalate, and polyethylene naphthalate.

8. The method as claimed in claim 1, wherein said extruding of said melt into a sheet is performed using a T-die.

9. The method as claimed in claim 6, further comprising forming said wound sheet into containers.

10. The method as claimed in claim 1, wherein said stretched sheet is uniaxially oriented.

* * * * *